(12) United States Patent
Hilgendorff et al.

(10) Patent No.: US 8,592,337 B2
(45) Date of Patent: Nov. 26, 2013

(54) NOX STORAGE MATERIALS AND TRAPS RESISTANT TO THERMAL AGING

(75) Inventors: Marcus Hilgendorff, Hannover (DE); Stanley A. Roth, Yardley, PA (US); Susanne Stiebels, Adenbüttel (DE)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 13/272,007

(22) Filed: Oct. 12, 2011

(65) Prior Publication Data
US 2012/0023915 A1   Feb. 2, 2012

Related U.S. Application Data

(63) Continuation of application No. 11/564,494, filed on Nov. 29, 2006, now abandoned.

(51) Int. Cl.
| | |
|---|---|
| *B01J 23/00* | (2006.01) |
| *B01J 23/10* | (2006.01) |
| *B01J 23/02* | (2006.01) |
| *B01J 23/06* | (2006.01) |
| *C01B 31/24* | (2006.01) |
| *C01F 17/00* | (2006.01) |

(52) U.S. Cl.
USPC ......... 502/304; 502/340; 423/419.1; 423/263

(58) Field of Classification Search
USPC ................ 502/304, 340; 423/419.1, 263
See application file for complete search history.

(56) References Cited

U.S. PATENT DOCUMENTS

| | | |
|---|---|---|
| 3,222,219 A | 12/1965 | Saunders et al. |
| 3,359,133 A | 12/1967 | Smyly |
| 3,443,978 A | 5/1969 | Restall |
| 3,518,206 A | 6/1970 | Sowards et al. |
| 3,891,575 A | 6/1975 | Brautigam et al. |
| 4,277,374 A | 7/1981 | Lula et al. |
| 4,374,173 A | 2/1983 | Adamovic |
| 4,492,769 A | 1/1985 | Blanchard et al. |
| 4,904,518 A | 2/1990 | Mercer et al. |
| 5,064,803 A | 11/1991 | Nunan |
| 5,075,275 A | 12/1991 | Murakami et al. |
| 5,168,085 A | 12/1992 | Addiego et al. |

(Continued)

FOREIGN PATENT DOCUMENTS

| | | |
|---|---|---|
| EP | 0813899 | 12/1997 |
| JP | 54028787 | 3/1979 |

(Continued)

OTHER PUBLICATIONS

PCT/US2007/085759—PCT Written Opinion Mar. 26, 2008, 10 pp.

(Continued)

*Primary Examiner* — Anthony J Zimmer
(74) *Attorney, Agent, or Firm* — Melanie L. Brown

(57) ABSTRACT

Nitrogen oxide storage materials and methods of manufacturing nitrogen oxide storage materials are disclosed. The nitrogen oxide storage materials can be used to manufacture catalytic trap disposed in an exhaust passage of an internal combustion engine which is operated periodically between lean and stoichiometric or rich conditions, for abatement of NOx in an exhaust gas stream which is generated by the engine. In one embodiment, the nitrogen oxide storage material comprises alkaline earth material supported on ceria particles having a crystallite size of between about 10 and 20 nm and the alkaline earth oxide having a crystallite size of between about 20-40 nm.

15 Claims, 6 Drawing Sheets

(56) References Cited

U.S. PATENT DOCUMENTS

| | | |
|---|---|---|
| 5,204,302 A | 4/1993 | Gorynin et al. |
| 5,244,852 A | 9/1993 | Lachman et al. |
| 5,422,331 A | 6/1995 | Galligan et al. |
| 5,437,933 A | 8/1995 | Coupland et al. |
| 5,750,026 A | 5/1998 | Gadkaree et al. |
| 5,874,057 A | 2/1999 | Deeba et al. |
| 5,965,481 A | 10/1999 | Durand et al. |
| 6,090,191 A | 7/2000 | Atlanova et al. |
| 6,180,558 B1 | 1/2001 | Kurokawa et al. |
| 6,214,303 B1 | 4/2001 | Hoke et al. |
| 6,350,421 B1 | 2/2002 | Strehlau et al. |
| 6,559,094 B1 | 5/2003 | Korotkikh et al. |
| 6,602,820 B1 | 8/2003 | Gobel et al. |
| 6,725,656 B2 | 4/2004 | Moore, III |
| 6,858,193 B2 | 2/2005 | Ruwisch et al. |
| 7,166,263 B2 | 1/2007 | Vanderspurt et al. |
| 2003/0144144 A1 | 7/2003 | Goto et al. |
| 2003/0165414 A1 | 9/2003 | Galligan et al. |

FOREIGN PATENT DOCUMENTS

| | | |
|---|---|---|
| JP | 54028787 A | 3/1979 |
| JP | 57117347 | 7/1982 |
| JP | 57117347 A | 7/1982 |
| WO | WO 03050397 | 6/2003 |
| WO | WO-2004/035511 A2 | 4/2004 |

OTHER PUBLICATIONS

PCT/US2007/085759—PCT International Search Report Mar. 26, 2008, 6 pp.

Non-Final Office Action in U.S. Appl. No. 12/497,846, mailed Jan. 20, 2011, 10 pgs.

PCT International Preliminary Report on Patentability in EP 07854809, Jun. 17, 2009, 9 pgs.

PCT Search Report and Written Opinion for PCT/US2007/085759, Jun. 11, 2009, 10 pgs.

PCT Search Report and Written Opinion for PCT/US2007/085759, (Jun. 11, 2009), 10 pgs.

Eberhardt, M. et al., "Fundamental Investigations of Thermal Aging Phenomena of Model NOx Storage Systems", *Topics in Catalysts* vols. 30/31 Jul. 2004, 135-142.

Jiafu, Chen et al., "The NOx Storage and Resistance of SO2 Poison on the BaCeO3 Perovskite Type Oxides", *Chinese Journal of Chemical Physics* Vo. 16, No. 5 Oct. 2003, 429-432.

Milt, V. G. et al., "Soot Oxidation on a Catalytic NOx Trap: Beneficial Effect of the Ba-K Interaction on the Sulfated Ba,K/CeO2 Catalyst", *Catalyst Communications* Sep. 10, 2006, 765-769.

Piacentini, M. et al., "Supported Pt-Ba NOx storage-reduction catalysts: Influence of support and Ba loading on stability and storage efficiency of Ba-containing species", *Applied Catalysis B: Environmental 66* 2006, 126-136 pgs.

NOX STORAGE MATERIALS AND TRAPS RESISTANT TO THERMAL AGING

RELATED APPLICATION

This application is a continuation of U.S. patent application Ser. No. 11/564,494, filed Nov. 29, 2006, the content of which is incorporated herein by reference in its entirety.

TECHNICAL FIELD

Embodiments of the invention relate to nitrogen oxide storage materials and methods for their manufacture. More particularly, embodiments of the invention pertain to NOx storage materials that are resistant to thermal aging and methods of making such materials. The nitrogen oxide storage materials may be part of a catalytic trap used to treat exhaust gas streams, especially those emanating from lean-burn gasoline or diesel engines.

BACKGROUND OF THE INVENTION

Emission of nitrogen oxides ("NOx") from lean-burn engines (described below) must be reduced in order to meet emission regulation standards. Conventional three-way conversion ("TWC") automotive catalysts are suitable for abating NOx, carbon monoxide a ("CO") and hydrocarbon ("HC") pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such future engines are referred to as "lean-burn engines". That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content. Although lean-burn engines provide enhanced fuel economy, they have the disadvantage that conventional TWC catalysts are not effective for reducing NOx emissions from such engines because of excessive oxygen in the exhaust. Attempts to overcome this problem have included operating lean-burn engines with brief periods of fuel-rich operation (engines which operate in this fashion are sometimes referred to as "partial lean-burn engines"). The exhaust of such engines is treated with a catalyst/NOx sorbent which stores NOx during periods of lean (oxygen-rich) operation, and releases the stored NOx during the rich (fuel-rich) periods of operation. During periods of rich (or stoichiometric) operation, the catalyst component of the catalyst/NOx sorbent promotes the reduction of NOx to nitrogen by reaction of NOx (including NOx released from the NOx sorbent) with HC, CO and/or hydrogen present in the exhaust.

Diesel engines provide better fuel economy than gasoline engines and normally operate 100% of the time under lean conditions, where the reduction of NOx is difficult due to the presence of excess oxygen. In this case, the catalyst/NOx sorbent is effective for storing NOx. As in the case of the gasoline partial lean burn application, after the NOx storage mode, a transient rich condition must be utilized to release/reduce the stored NOx to nitrogen. In the case of the diesel engine, this transient reducing condition will require unique engine calibration or injection of a diesel fuel into the exhaust to create the next reducing environment.

NOx storage (sorbent) components including alkaline earth metal oxides, such as oxides of Mg, Ca, Sr and Ba, alkali metal oxides such as oxides of Li, Na, K, Rb and Cs, and rare earth metal oxides such as oxides of Ce, La, Pr and Nd in combination with precious metal catalysts such as platinum dispersed on an alumina support have been used in the purification of exhaust gas from an internal combustion engine. For NOx storage, baria is usually preferred because it forms nitrates at lean engine operation and releases the nitrates relatively easily under rich conditions. However, catalysts that use baria for NOx storage exhibit a problem in practical application, particularly when the catalysts are aged by exposure to high temperatures and lean operating conditions. After such exposure, such catalysts show a marked decrease in catalytic activity for NOx reduction, particularly at low temperature (200 to 350° C.) and high temperature (450° C. to 600° C.) operating conditions. In addition, NOx absorbents that include baria suffer from the disadvantage that when exposed to temperatures above 450° C. in the presence of $CO_2$, barium carbonate forms, which becomes more stable than barium nitrate. Furthermore, barium tends to sinter and to form composite compounds with support materials, which leads to the loss of NOx storage capacity.

NOx storage materials comprising barium fixed to ceria particles have been reported, and these NOx materials have exhibited improved thermal aging properties compared to the catalyst materials described above. Despite these improvements, there is an ongoing need to improve the performance of NOx storage materials, particularly the ability of these materials to operate over a wide temperature range and to operate effectively after exposure to high temperature. It is also desirable to improve the kinetics of NOx oxidation (required in advance of NOx storage) and the kinetics of NOx reduction (required following NOx release). Thus, there is a need to provide improved NOx storage materials and methods for their manufacture.

SUMMARY OF THE INVENTION

Aspects of the invention include nitrogen oxide storage materials, catalytic traps for the abatement of nitrogen oxide, methods for manufacturing both the nitrogen oxide storage materials and the catalytic traps for the abatement of nitrogen oxides, and methods of abating nitrogen oxide in an exhaust gas stream.

According to one embodiment, the nitrogen oxide storage materials comprise ceria particles having alkaline earth oxides, for example, baria, supported on the particles, the ceria having a crystallite size of between about 10 and 20 nm and the alkaline earth oxides having a crystallite size of between about 20 and 40 nm. Other suitable alkaline earth oxides include oxides of Mg, Sr, and Ca. In certain embodiments, the composite particles have a BET surface area of between about 30 and 80 $m^2/g$. In another embodiment, a nitrogen oxide storage catalyst is provided comprising a coating on a substrate, the coating comprising a nitrogen oxide storage material comprising spray-dried ceria particles having baria supported on the particles.

In certain embodiments, the coating of the nitrogen oxide storage catalyst further comprises at least one member of platinum group metals selected from the group consisting of platinum, palladium, rhodium, iridium and mixtures thereof supported on refractory oxide particles. The refractory oxide particles may be selected from the group consisting of aluminum oxide, mixed aluminum oxide and zirconium oxide, mixed aluminum oxide and lanthanum oxide, mixed aluminum oxide and cerium oxide, mixed aluminum oxide and magnesium oxide, and aluminumoxide mixed with one or more of zirconia and lanthana.

Another embodiment relates to a catalytic trap disposed in an exhaust passage of an internal combustion engine which operates periodically between lean and stoichiometric or rich conditions, for abatement of NOx in an exhaust gas stream which is generated by the engine. The catalytic trap comprises a catalytic trap material including a precious metal catalytic component effective for oxidizing NO to $NO_2$ under lean conditions and promoting the reduction of released NOx to nitrogen under stoichiometric or rich conditions supported on a refractory metal oxide, and a NOx storage material effective for adsorbing the NOx under lean conditions and desorbing the NOx under stoichiometric or rich conditions, the NOx storage material comprising particles of ceria having alkaline earth carbonate supported on the ceria particles, having a crystallite size of between about 10 and 20 nm and the alkaline earth oxide having a crystallite size of between about 20 and 40 nm, and the catalytic trap material being disposed on a refractory carrier member. Still another embodiment relates to a method of making a nitrogen oxide storage material comprising mixing a solution of barium with ceria particles, spray drying the particles, heating the spray-dried particles, mixing the composite particles with a precious metal supported catalyst and coating the slurry mixture of particles on a substrate.

DETAILED DESCRIPTION OF THE INVENTION

Figure 1:
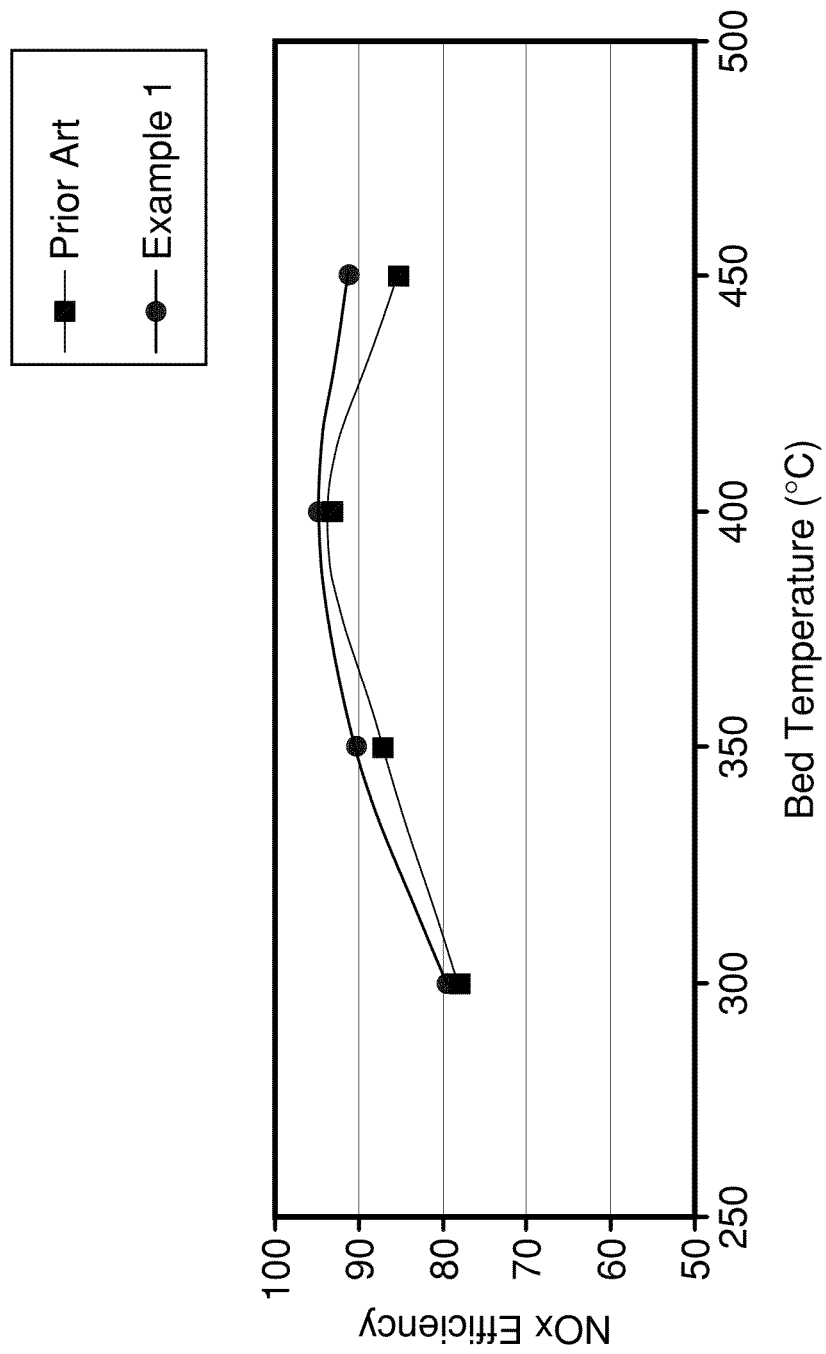
FIG. 1 is a graph showing the nitrogen oxide conversion efficiency of a catalyst in accordance with an embodiment of the invention and a comparative reference catalyst.

Before describing several exemplary embodiments of the invention, it is to be understood that the invention is not limited to the details of construction or process steps set forth in the following description. The invention is capable of other embodiments and of being practiced or being carried out in various ways.

In one embodiment of the invention, a spray-dried NOx storage material comprising alkaline earth carbonate or mixtures of carbonates, for example, $BaCO_3$ or mixtures of $BaCO_3$ and $MgCO_3$ supported on $CeO_2$ particles is provided. According to one or more embodiments of the invention, Ba sintering and Ba composite compound formation is reduced under the conditions of thermal stress in an exhaust gas of a lean burn engine. The NOx storage material according to embodiments of the present invention demonstrates improved NOx storage capacity after thermal aging when used in a catalytic trap.

According other embodiments of the invention, methods of manufacturing NOx storage materials and catalytic traps including these storage materials are provided. Other embodiments of the invention pertain to a catalytic trap for abatement of NOx in an exhaust gas stream which is generated by an internal combustion engine which is operated periodically between lean and stoichiometric or rich conditions. According to one or more embodiments, the catalytic trap comprises a catalytic trap material including a catalytic component effective for promoting the reduction of NOx under stoichiometric or rich conditions supported on a refractory metal oxide and a NOx storage material effective for adsorbing the NOx under lean conditions and desorbing and reducing the NOx to nitrogen under stoichiometric or rich conditions, the NOx storage material comprising spray-dried particles of ceria having alkaline earth carbonate, for example, barium carbonate, supported on the ceria particles, the catalytic trap material being disposed on a refractory carrier member.

Embodiments of this invention pertain to a process for abatement of NOx in an exhaust gas stream generated by an internal combustion engine which periodically operates alternately between lean and stoichiometric or rich conditions, comprising locating the above-described catalytic trap in an exhaust passage of the engine and treating the exhaust gas stream with a catalytic trap whereby at least some of the NOx in the exhaust gas stream is adsorbed by the catalytic trap during the periods of lean conditions and is desorbed from the catalytic trap and reduced to nitrogen during the periods of stoichiometric or rich conditions.

The refractory metal oxide support of the catalytic trap may be porous in nature and has a high surface area such as alumina, for example, gamma-alumina. Other suitable support materials include titania, titania-alumina, zirconia, zirconia-alumina, baria-alumina, lanthana-alumina, lanthana-zirconia-alumina titania-zirconia, and mixtures thereof. Desirably, the refractory metal oxide support will have a surface area of between about 5 and about 350 $m^2/g$, and more particularly between about 100 and 200 $m^2/g$. Typically, the support will be present on the coated substrate in the amount of about 1.5 to about 7.0 $g/in^3$, for example between about 3 and 6 $g/in^3$. A suitable support material for the precious metal is alumina, which may be doped with one or more other materials. Alumina having a BET surface area of about 200 $m^2/g$ and doped with 10%-30% $ZrO_2$ and 1%-4% LaO provided good results.

In one or more embodiments of the present invention the catalytic component preferably comprises a precious metal component, i.e., a platinum group metal component. Suitable precious metal components include platinum, palladium, rhodium and mixtures thereof. The catalytic component will typically be present in an amount of about 20 to about 200 $g/ft^3$, more specifically, about 60 to 120 $g/ft^3$.

The NOx storage material employed in the catalytic trap according to embodiments of the present invention comprises a spray-dried NOx storage material comprising $BaCO_3$ supported on $CeO_2$ particles.

In one or more embodiments, the catalytic trap is disposed on a refractory carrier member. Examples of such substrates include, for example, stainless steel, titanium, aluminum zirconate, aluminum titanate, aluminum phosphate, cordierite, mullite and corundum. The carrier member may be employed as a monolithic honeycomb structure, spun fibers, corrugated foils, layered materials, etc.

In a gasoline vehicle application, a catalytic device employing a three-way conversion ("TWC") catalyst may be used in conjunction with the catalytic trap of the invention. Such a device will be located in an exhaust passage of the internal combustion engine and will be disposed upstream and/or downstream of the catalytic trap. The TWC catalyst would typically include platinum, palladium and rhodium catalytic components dispersed on a high surface area refractory support and may also contain one or more base metal oxide catalytic components such as oxides of iron, manganese or nickel. Such catalysts can be stabilized against thermal degradation by expedients such as impregnating an activated alumina support with one or more rare earth metal oxides, e.g., ceria. Such stabilized catalysts can sustain very high operating temperatures. For example, if a fuel cut technique is utilized, temperatures as high as 1050° C. may be sustained in the catalytic device.

If the catalytic device is employed and is located upstream of the catalytic trap of the invention, the catalytic device would be mounted close to the exhaust manifold of the engine. In such an arrangement, the TWC catalyst would warm up quickly and provide for efficient cold start emission control. Once the engine is warmed up, the TWC catalyst will remove HC, CO and NOx from the exhaust gas stream during stoichiometric or rich operation and HC and CO during lean operation. The catalytic trap of the invention would be positioned downstream of the catalytic device where the exhaust gas temperature enables maximum NOx trap efficiency. During periods of lean engine operation, when NOx passes through the TWC catalyst, NOx is stored on the catalytic trap. The catalytic trap is periodically desorbed and the NOx is reduced to nitrogen under periods of stoichiometric or rich engine operation. If desired, a catalytic device containing a TWC catalyst may be employed downstream of the catalytic trap of the invention. Such catalytic device will serve to remove further amounts of HC and CO from the exhaust gas stream and, in particular, will provide for efficient reduction of the NOx to nitrogen under periods of stoichiometric or rich engine operation.

In a diesel vehicle application, the catalytic NOx-trap according to embodiments of the invention may be used in conjunction with a diesel oxidation catalyst (DOC), and a catalyzed soot filter (CSF); where the DOC and CSF are placed either before or after the catalytic device of this invention. In another embodiment of the invention, it is possible to place the NOx-trap catalyst directly onto the filter media.

The several components of the catalytic trap material may be applied to the refractory carrier member, i.e., the substrate, as a mixture of two or more components or as individual components in sequential steps in a manner which will be readily apparent to those skilled in the art of catalyst manufacture. A typical method of manufacturing the catalytic trap of the present invention is to provide the catalytic trap material as a coating or layer of washcoat on the walls of the gas-flow passages of a suitable carrier member. This may be accomplished, by impregnating a fine particulate refractory metal oxide support material, e.g., gamma alumina, with one or more catalytic metal components such as a precious metal, i.e., platinum group, compound or other noble metals or base metals, drying and calcining the impregnated support particles and forming an aqueous slurry of these particles. Spray-dried particles of the bulk NOx sorbent may be included in the slurry. Alternatively, the NOx storage material or sorbent may be dispersed into the support, preferably in an impregnation operation, as described below. Activated alumina may be thermally stabilized before the catalytic components are dispersed thereon, as is well known in the art, by impregnating it with, e.g., a solution of a soluble salt of barium, lanthanum, zirconium, rare earth metal or other suitable stabilizer precursor, and thereafter drying (e.g., at 110° C. for one hour) and calcining (e.g., at 550° C. for one hour) the impregnated activated alumina to form a stabilizing metal oxide dispersed onto the alumina. Base metal catalysts may optionally also have been impregnated into the activated alumina, for example, by impregnating a solution of a base metal nitrate into the alumina particles and calcining to provide a base metal oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the catalytic trap material, to the walls of the passages thereof. The carrier may then be immersed into a slurry of fine particles of component of the NOx storage material as a second or overlayer coating deposited over the layer of catalytic component. A magnesium component, e.g., a solution of a magnesium salt such as magnesium nitrate, acetate, sulfate, hydroxide, etc., may be combined with the slurry of component of the NOx storage material or it may be applied as a third or overlayer coating deposited over the second layer of the NOx storage material. The carrier is then dried and calcined to provide a finished catalyst trap member in accordance with one embodiment of the present invention.

Alternatively, the alumina or other support particles impregnated with the catalytic component may be mixed with bulk or supported particles of the NOx storage material in an aqueous slurry, and this mixed slurry of catalytic component particles and NOx storage material particles may be applied as a coating to the walls of the gas-flow passages of the carrier. Preferably, however, for improved dispersion of the NOx storage material, the washcoat of catalytic component material, after being dried and calcined, is immersed (post-dipped) into a solution of a component (NOx storage material precursor compound (or complex) and a magnesium precursor compound (or complex) to impregnate the washcoat with the NOx storage material precursor. The impregnated washcoat is then dried and calcined to provide the NOx storage material dispersed throughout the washcoat.

Separate discrete layers of washcoat may be applied in successive impregnating/drying/calcining operations, e.g., to provide a bottom washcoat layer containing a platinum catalytic component in a bottom washcoat layer and a palladium and/or rhodium catalytic component in a top washcoat layer. The NOx storage material may be dispersed by impregnation into both the top and bottom layers.

In use, the exhaust gas stream which is contacted with the catalytic trap of the present invention is alternately adjusted between lean and stoichiometric/rich operating conditions so as to provide alternating lean operating periods and stoichiometric/rich operating periods. It will be understood that the exhaust gas stream being treated may be selectively rendered lean or stoichiometric/rich either by adjusting the air-to-fuel ratio fed to the engine generating the exhaust or by periodically injecting a reductant into the gas stream upstream of the catalytic trap. For example, the composition of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions.

Without intending to limit the invention in any manner, embodiments of the present invention will be more fully described by the following examples.

EXAMPLES

Example 1

Preparation of NOx Storage Material $BaCO_3$ and $CeO_2$ were intimately mixed and finely dispersed in a weight ratio of between about 1:3 and about 1:5. Cerium oxide having a BET surface area of between about 50-150 $m^2/g$ was mixed with a solution of barium acetate such that the $BaCO_3/CeO_2$ composite had a $BaCO_3$ content of about 10-30 wt %. After mixing, the suspension of soluble barium acetate and $CeO_2$ was then spray-dried at a temperature of between about 90° C. and 120° C. to obtain a solid mixture of barium acetate and ceria.

After spray-drying, the mixture was then heated at about 550° C. to 800° C. for about 2 hours to form particles of ceria having barium carbonate supported on the ceria particles. The resulting $BaCO_3$ had a crystallite size of between about 20 and 40 nm. The $BaCO_3$ and $CeO_2$ crystallites formed particles with a size of between about 5 and 50 microns. The BET surface area of the particulate mixture is between about 30 and 80 $m^2/g$.

Preparation of Catalytic Component

To provide a fully formulated NOx storage catalyst or catalytic trap as described above, in addition to the manufacture of barium carbonate supported on ceria, a precious metal can be supported on a refractory oxide according to the following description. Pt and Rh are impregnated onto $Al_2O_3$ by an incipient wetness procedure to yield 1.8 weight percent Pt and 0.1 weight percent Rh. Pd is impregnated separately onto alumina to a Pd loading of 1.4 weight percent.

A slurry mixture containing about 34 wt % of alumina previously mixed with Pt/Rh, about 9 wt % Pd on alumina, a solution of zirconium acetate with a content of about 3 wt % $ZrO_2$, magnesium acetate to yield 9 wt % MgO, and 45 wt % $BaCO_3/CeO_2$ spray-dried powder is milled at pH 6-8 until a particle size of 11 micron ($D_{90}$) is obtained.

Coating of a Substrate

Ceramic or metallic honeycomb substrates are coated with the slurry in a dip coating manner and then dried in a dryer and subsequently calcined in a furnace under air at about 450° C.-550° C. The coating procedure is then repeated until a loading of about 4-6.5 $g/in^3$ is achieved. The coating on the honeycomb catalyst comprises about 3-30 micron $BaCO_3/CeO_2$ particles and about 1-20 micron alumina particles. $BaCO_3$ is fixed within the pores of the ceria particles in such a way that it does not migrate to the alumina particles. It is believed that the contact of $BaCO_3$ and alumina would lead to the formation of inactive $Ba/Al_2O_3$ composite compound formation upon aging, which has a reduced NOx storage capacity compared to $BaCO_3$.

Comparative Example 2

Samples were prepared in accordance with Example 1 above, except that the barium acetate/ceria solution was not spray dried.

Example 3

NOx Storage Capacity Testing

Two catalytic traps were prepared, a first catalytic trap was prepared in accordance with Example 1 and a comparative catalytic trap was prepared in accordance with Comparative Example 2. Both catalytic traps A were evaluated after aging for 8 hours at 850° C.

Both catalytic traps were evaluated as follows. An engine was set to an air/fuel ratio of 11.6 for 2 minutes at the desired temperature to remove all stored NOx and oxygen from the catalyst. This mode represents rich engine operation. Subsequently, the engine was adjusted to an air/fuel ratio of 29.6 under constant NOx mass flow. This mode represents lean engine operation. During the whole test, the NOx concentration was measured before and after the NOx trap using a NOx analyzer.

$$U = \frac{NO_x^{massoutlet}}{NO_x^{massinlet}} \cdot 100 \tag{1}$$

After the 2 minute rich operation followed by a 60 second lean operation, the engine was set to a 3 second rich operation to remove stored NOx without having hydrocarbon and carbon monoxide tailpipe emissions. This 60 sec lean/3 sec rich cycle is repeated 10 times to establish constant catalyst conditions. For the time period of the 10 lean/rich cycles the NOx efficiency (U) is calculated from the NOx inlet and NOx outlet concentrations via equation (1): NOx storage mass in g is calculated via equation (2):

$$NO_x^{mass}(g) = \int NO_x * \dot{V}/V_{ideal} * M_S * 1/(3.6*10^6) dt \tag{2}$$

NOx=NOx concentration (ppm)
V=volume flow (m3/h)
$V_{ideal}$=ideal molar volume (l/mol) at STP
$M_S$=Molar weight of NO2 (g/mol)
dt=time interval (s)

After the 10 lean/rich cycles, the engine is operated for 1 min rich to remove the stored NOx completely. Subsequently, the engine is operated under lean condition until no more NOx is stored in the trap. Under these conditions, the overall NOx storage capacity is evaluated. However, to achieve a NOx conversion of greater than 80%, the NOx storage capacity at high NOx efficiency is decisive. FIG. 1 demonstrates that the NOx storage capacity of catalytic trap prepared in accordance with Example 1 utilizing a spray-drying process exhibited superior capacity compared to the Comparative reference Example.

Example 4

Barium Concentration and Calcination Temperature

Different amounts of Ba were impregnated into ceria of different surface area, using the procedures described in Example 1. Ceria powders with different BET surface areas were used to determine the effect of the resulting Ba/Ceria composite powder.

Characterization of the impregnated powder included BET surface area measurement. In addition fully formulated NOx trap catalysts were prepared using the procedures described in Example 1 that contain the particular Ba/Ceria composite material as NOx storage component. The NOx storage properties of the catalysts have been evaluated after aging for 8 hours at 850° C. under air with 10% $H_2O$ in a laboratory reactor. The results are shown in Table I and Table II below.

Table I shows the result of a variation of the $BaCO_3$ and $CeO_2$ concentration together with a variation of the ceria used. After impregnation, all samples were calcined at In order to determine an optimum $BaCO_3/CeO_2$ composite, the $Ba/CeO_2$ is calcined after Ba impregnation at different temperatures. This is done to decompose the Ba precursor to the carbonate and to conditioning the composite for optimum NOx adsorption capacity. The data in Table II demonstrates that a calcination temperature between 550 and 750° C. after impregnation of Ba onto $CeO_2$ provided the best results for NOx storage. The samples calcined within this temperature range had higher surface area and exhibited higher NOx storage after aging than a sample calcined at 850° C. Furthermore, a $BaCO_3$ crystallite size of between about 20-50 nm, for example, 45 nm, and a $CeO_2$ crystallite size of between about 25-30 nm in combination with a sufficient BET surface area after aging yielded the highest NOx storage at 400° C. According to the data in Tables I and II, an as-prepared BET surface area between 40-60 $m^2/g$ and a ceria crystal size between about 10- and 20 nm and a $BaCO_3$ crystallite size of between about 20- and 40 nm yielded the best performance after aging.

Figure 6:
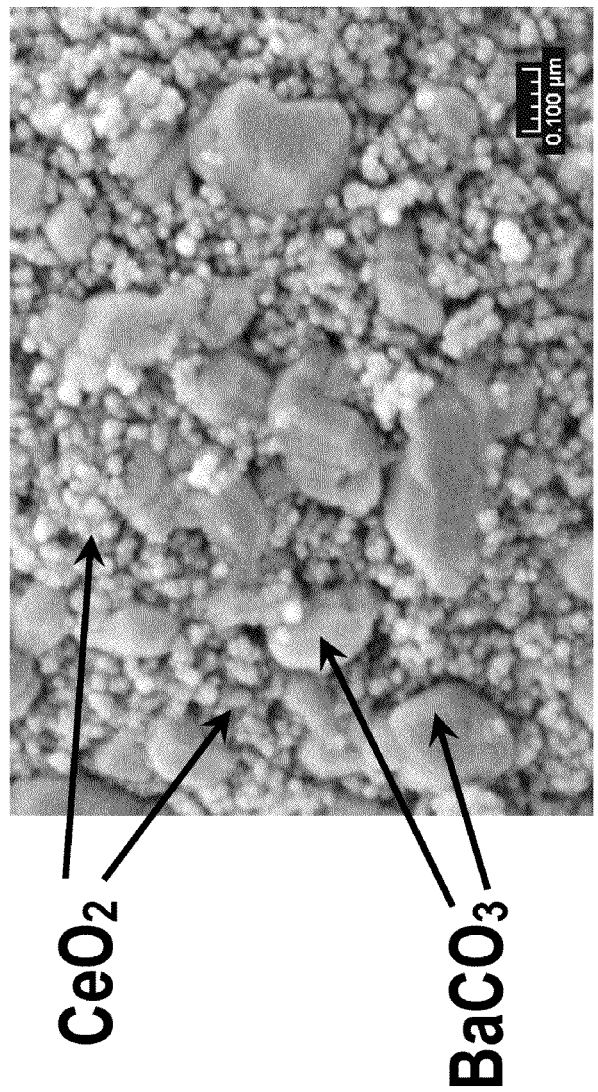
FIG. 6 is a SEM image of the spray dried and calcined $BaCO_3/CeO_2$ composite material.

An example of a desirable morphology of spray dried and calcined $BaCO_3/CeO_2$ mixture is shown in the SEM image of FIG. 6. FIG. 6 shows about 10-20 nm size $CeO_2$ crystals agglomerated to particles of about 5-50 microns in size. Adhering to these about 5-50 micron size $CeO_2$ particles are $BaCO_3$ particles of about 20-150 nm size. The $BaCO_3$ particles are likely agglomerates of smaller crystallites.

TABLE I

550° C. in air to decompose the impregnated Ba precursor into $BaCO_3$.

| Sample | $BaCO_3$ Wt % | $CeO_2$ wt % | BET Surface area of Ceria ($m^2/g$) | $CeO_2$ Crystallite (nm) | BET Ba/Ceria calcined 4 h 800° C. ($m^2/g$) | $BaCO_3$ Crystallite size As prepared (nm) | $BaCO_3$ Crystallite size Aged, 4 h 800° C. (nm) | $CeO_2$ Crystallite size of Ceria in Ba/Ceria aged 4 h 800° C. (nm) | NOx Storage at 300° C. (g/l) | NOx Storage at 400° C. (g/l) |
|---|---|---|---|---|---|---|---|---|---|---|
| A | 29 | 71 | 90 | 12 | 13 | 20 | 34 | 28 | 2.8 | 2.4 |
| B | 29 | 71 | 40 | 18 | 9 | 22 | 30 | 34 | 1.4 | 2.0 |
| C | 25 | 75 | 66 | 16 | 14 | 21 | 32 | 28 | 2.6 | 2.7 |
| D | 20 | 80 | 90 | 12 | 17 | 22 | 40 | 27 | 3.5 | 1.9 |
| E | 20 | 80 | 40 | 18 | 13 | 20 | 26 | 31 | 2.3 | 2.4 |

After 800° C. aging, the highest NOx storage activity at 400° C. is obtained with sample C, having a medium Ba concentration and a $CeO_2$ material with a medium BET surface area and crystallinity. A high BET surface area and relative low Ba concentration is especially beneficial for NOx storage at 300° C. It is particularly interesting that sample D having the largest $BaCO_3$ crystallite size after aging yields the best NOx storage at low temperature. In addition, increased Ba concentration resulted in decreased BET surface area and increase in $CeO_2$ crystal size.

Example 5

Ceria Type and Doping

Various types of ceria and doping with different materials were evaluated for effect on BET surface area and decomposition temperature of the barium carbonate. The decomposition temperature is the temperature at which Ba reacts with ceria to form $BaCeO_3$. The samples below were prepared by an incipient wetness preparation instead of spray-drying prior to calcination. The results are shown in Table III:

TABLE II

| Sample | $BaCO_3$ Wt % | $CeO_2$ wt % | BET surface area of (m2/g) | $BaCO_3$/Ceria calcination Temp ° C. (2 h after spray drying) | BET Ba/Ceria calcination ($m^2/g$) | $CeO_2$ crystallite size of Ceria in Ba/Ceria (nm) | BaCO3 crystallite size after calcination (nm) | BET Ba/Ceria aged 4 h 800° C. ($m^2/g$) | $BaCO_3$ crystallite size Aged, 4 h 800° C. (nm) | $CeO_2$ crystallite size of Ceria in Ba/Ceria aged 4 h 800° C. (nm) | NOx storage at 300° C. (g/l) | NOx storage at 400° C. (g/l) |
|---|---|---|---|---|---|---|---|---|---|---|---|---|
| F | 29 | 71 | 200 | 550 | 66 | 9 | 18 | 17 | 37 | 29 | 2.0 | 1.7 |
| G | 29 | 71 | 200 | 650 | 54 | 10 | 28 | 16 | 40 | 26 | 3.5 | 1.8 |
| H | 29 | 71 | 200 | 750 | 21 | 24 | 40 | 16 | 45 | 28 | 2.5 | 2.7 |
| I | 29 | 71 | 200 | 850 | 14 | 33 | 37 | 12 | 40 | 32 | 1.1 | 1.3 |

TABLE III

| | Material | Decomposition Temperature of $BaCO_3$ (° C.) | BET surface as prepared ($m^2/g$) | BET surface after aging at 950° C. ($m^2/g$) | phases observed by XRD after thermal treatment (950° C.) |
|---|---|---|---|---|---|
| A | (90% $CeO_2$, 10% La) + 15% Ba | 914 | 13 | 1.8 | $BaCeO_3$, $CeO_2$, $BaCO_3$ |
| C | (57% $CeO_2$, 43% Pr) + 15% Ba | 950 | 44 | 6 | $BaCeO_3$, $CeO_2$ |
| D | (72% $CeO_2$, 28% La) + 15% Ba | 770 | 31 | 6 | $BaCeO_3$, $CeO_2$ |
| B | (90% $CeO_2$, 10% La) + 15% Ba (Example 5B) | 945 | 30 | 6.6 | $BaCeO_3$, $CeO_2$, $BaCO_3$ |
| E | (95% $CeO_2$, 5% La) + 15% Ba | 945 | 25 | 10 | $BaCeO_3$, $CeO_2$, $BaCO_3$ |
| F | (90% $CeO_2$, 10% La) + 15% Ba (Example 5F) | 945 | 30 | 10 | $BaCeO_3$, $CeO_2$, $BaCO_3$ |
| G | (100% $CeO_2$) + 15% Ba | 942 | 41 | 13 | $BaCeO_3$, $CeO_2$, $BaCO_3$ |
| H | (91% $CeO_2$, 9% Pr) + 15% Ba | 950 | 86 | 16 | $BaCeO_3$, $CeO_2$ |

According to the data in table III, doping ceria with La or Pr to a level of 10% does not influence the decomposition temperature of $BaCO_3$. Only sample D with 28% La has a much lower temperature of $BaCO_3$ decomposition while sample C even with 43% of Pr has a high resistance towards reaction with $BaCO_3$.

The preferred $BaCO_3$/$CeO_2$/dopand material should have a BET surface area >10 $m^2/g$ after aging and a high resistance towards reaction to $BaCO_3$ as shown in table III.

Example 6

Precious Metal Support

Various alumina supports were evaluated for stability. It was found that the support material for the precious metal tends to react with $BaCO_3$ at a certain temperature. If this temperature for a specific material is reached most or all of the $BaCO_3$ has formed a compound with the support material and this compound has much diminished tendency to adsorb NOx compared to $BaCO_3$.

The table below shows a list of different support materials derived from $ZrO_2$ or $Al_2O_3$. Materials A and B show higher $BaCO_3$ decomposition temperature than pure or La, Ba or $ZrO_2$ doped aluminas. However the surface area of those materials is relatively small compared to other doped or undoped materials. Furthermore, it was found that the higher the surface area of a material in presence of Ba the higher is the NOx storage capacity of an aged catalyst containing this material.

In particular, it was found that $ZrO_2$ doped aluminas and also La and $ZrO_2$ doped materials have very thermally stable surface areas in presence of Ba. The preferred alumina should have a BET surface area of 150-250 $m^2/g$, a pore volume of 0.3-0.8 ml/g an average pore size of 3-20 nm.

TABLE IV

| | $Al_2O_3$/$ZrO_2$ derived support + 15% BaO | Decomposition temperature of $BaCO_3$ (° C.) | BET surface as prepared ($m^2/g$) | BET after 4 h 900° C. | phases observed by XRD after thermal treatment |
|---|---|---|---|---|---|
| A | (92% $ZrO_2$, 8% $La_2O_3$) | 820 | 36 | | $BaZrO_3$, $BaCO_3$, $ZrO_2$ |
| B | (31% MgO, 69% $Al_2O_3$) | 830 | 64 | 39 | $MgAl_2O_4$, $BaAl_2O_4$ |
| C | (20% Ba, 80% $Al_2O_3$) | 740 | 101.3 | 61 | $BaCO_3$, $BaAl_2O_4$ |
| D | (4% La, 20% $ZrO_2$, 76% Al2O3) | 736 | 96 | | $CeO_2$, $Al_2O_3$, $BaAl_2O_4$ |
| E | (100% $Al_2O_3$) | 765 | 73.6 | 67.9 | $Al_2O_3$, $ZrO_2$ |
| F | (90% $Al_2O_3$ + 10% $CeO_2$) | 730 | 81 | 73 | $CeO_2$, $BaAl_2O_4$ |
| G | (30% $ZrO_2$, 70% $Al_2O_3$) | 740 | 88 | | $BaAl_2O_4$, $ZrO_2$ |
| H | (20% Ba, 80% $Al_2O_3$) | 695 | 156 | 83 | $BaAl_2O_4$ |
| I | (82% $Al_2O_3$, 11% $CeO_2$, 7% $ZrO_2$) | 720 | 118 | 80 | $Al_2O_3$, $BaCO_3$ |
| J | (100% $Al_2O_3$) | 720 | 116 | 106 | $BaAl_2O_4$ |
| K | (72% $Al_2O_3$, 28% Mg) | 750 | 130 | 100 | $MgAl_2O_4$, $BaAl_2O_4$, $BaCO_3$ |
| L | (90% $Al_2O_3$, 10% $ZrO_2$) | 700 | 133.5 | | $BaAl_2O_4$, $Al_2O_3$ |
| M | (80% $Al_2O_3$, 20% $CeO_2$) | 720 | 133 | 100 | $CeO_2$, $Al_2O_3$ |

TABLE IV-continued

| | $Al_2O_3/ZrO_2$ derived support + 15% BaO | Decomposition temperature of $BaCO_3$ (° C.) | BET surface as prepared ($m^2/g$) | BET after 4 h 900° C. | phases observed by XRD after thermal treatment |
|---|---|---|---|---|---|
| N | (80% $Al_2O_3$, 20% $ZrO_2$) | 720 | 121.7 | 100.5 | $Al_2O_3$, $ZrO_2$ |
| O | (4% La/15% $ZrO_2$) | 700 | 126 | | $BaAl_2O_4$, $ZrO_2$, $Al_2O_3$ |
| P | (21% Mg, 10% Zr, 69% $Al_2O_3$) | 730 | 142 | | $BaCO_3$, $MgAl_2O_4$, $ZrO_2$ |
| Q | (97% $Al_2O_3$, 3% La) | 720 | 152 | 121 | $Al_2O_3$ |
| R | (75% $Al_2O_3$ 25% $ZrO_2$) | 700 | 135 | | $ZrO_2$, $Al_2O_3$, $BaCO_3$ |
| S | (90% $Al_2O_3$ 10% $ZrO_2$) | 700 | 154 | 124.1 | $Al_2O_3$, $BaCO_3$, $BaAl_2O_4$ |
| T | (85% $Al_2O_3$ 15% $ZrO_2$) | 700 | 142 | | $ZrO_2$, $Al_2O_3$, $BaCO_3$ |
| U | (74.6% $Al_2O_3$, 0.4% La/15% $ZrO_2$) | 748 | 156 | 132 | $BaAl_2O_4$, $Al_2O_3$, $ZrO_2$, $BaCO_3$ |

Example 7

Optimization of Aged NOx Storage Capacity

Figure 2:
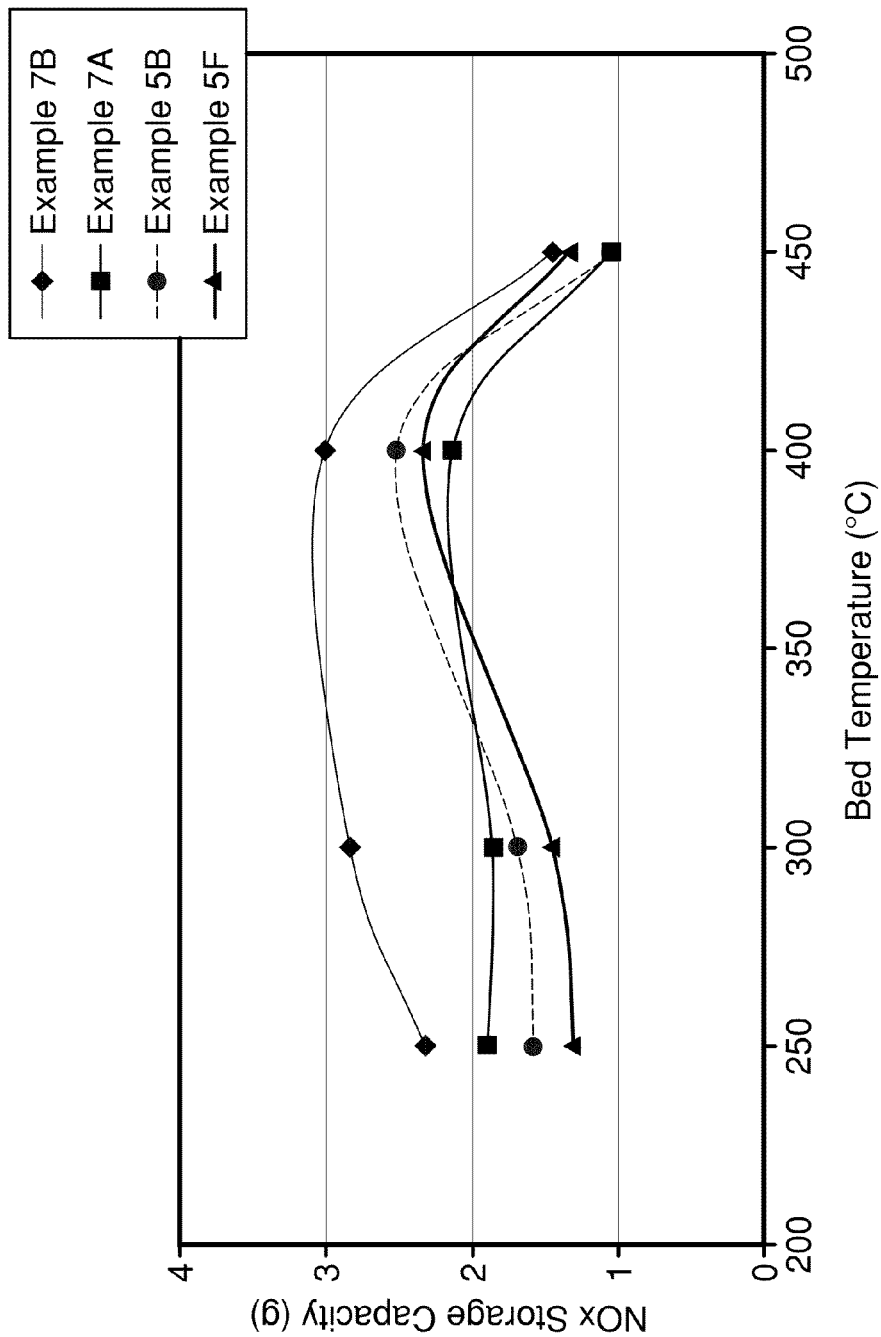
FIG. 2 is a graph comparing the nitrogen oxide storage capacity of various catalysts.

Various samples were tested for aged NOx storage capacity for samples aged at 850° C. in an oven with 10% steam in air. A sample prepared in accordance with comparative Example 1 having the NOx sorbent samples with $BaCO_3/CeO_2$ concentration of sample C in Table I but spray dried and calcined to different surface areas as indicated (Example 7A=41 $m^2/g$ and Example 7B=52 $m^2/g$). In addition, samples and B and F from table III were tested after spray drying with barium, preparing in accordance with Example 1 and aging in a laboratory reactor. The results shown in FIG. 2 demonstrate the spray dried and calcined material 7B, with a BET surface area of 52 $m^2/g$ exhibited the highest NOx storage capacity, while the other samples had similar performance. According to these tests, there is no benefit associated with doping ceria with 10% of La.

Figure 3:
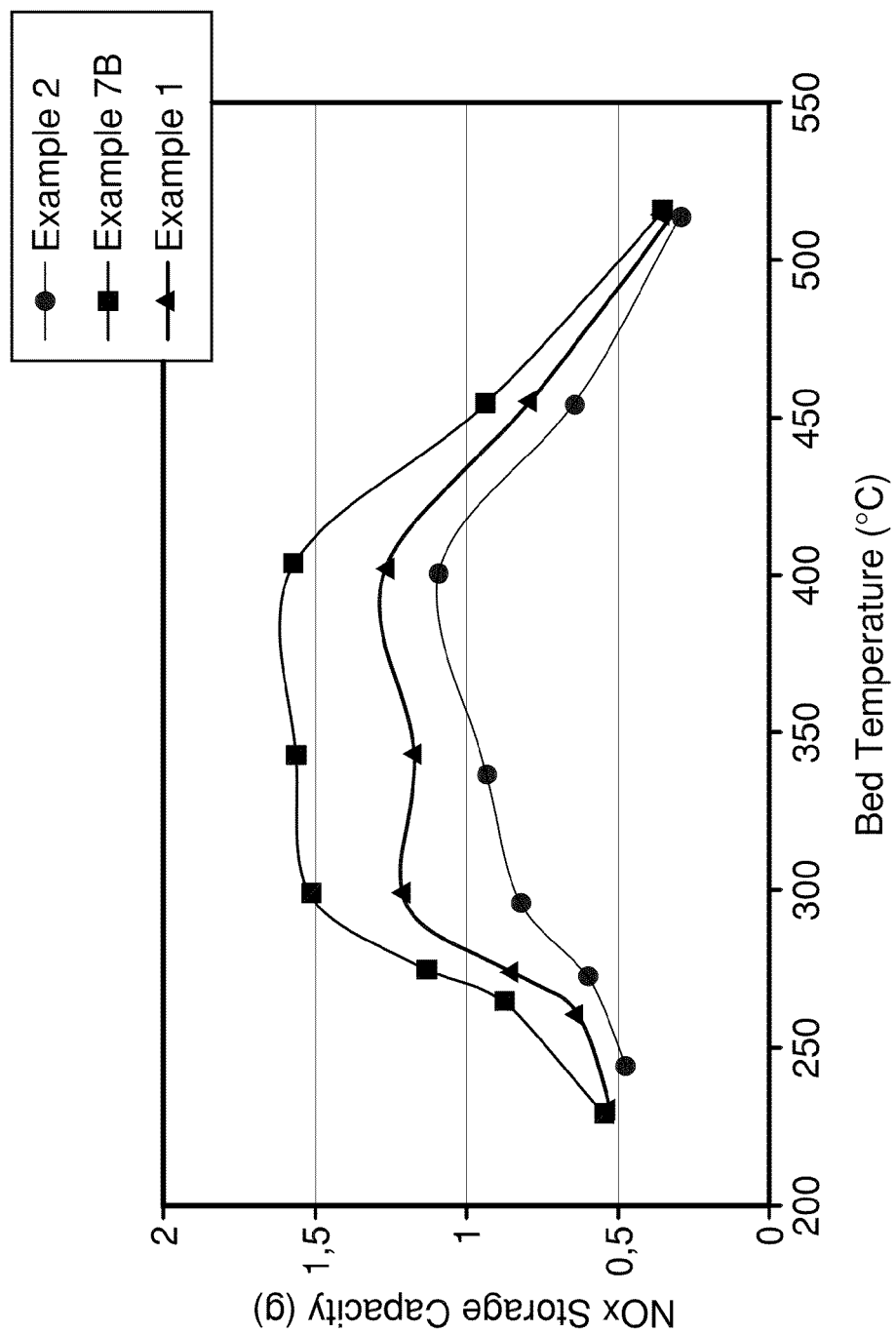
FIG. 3 is a graph comparing the nitrogen oxide storage capacity of catalysts.

Various samples were tested for aged NOx storage capacity for samples aged at 850° C. for 50 hours in an engine at stoichiometric air fuel ratio. In this case, the evaluation has been done at an engine. Samples prepared in accordance with comparative Example 2 (NOx sorbent prepared by impregnation), by spray drying and by spray drying with optimized BET surface area were prepared. The results shown in FIG. 3 demonstrate the spray-dried sample exhibited superior results, particularly the sample with optimized BET surface area.

Example 8

Figure 4:
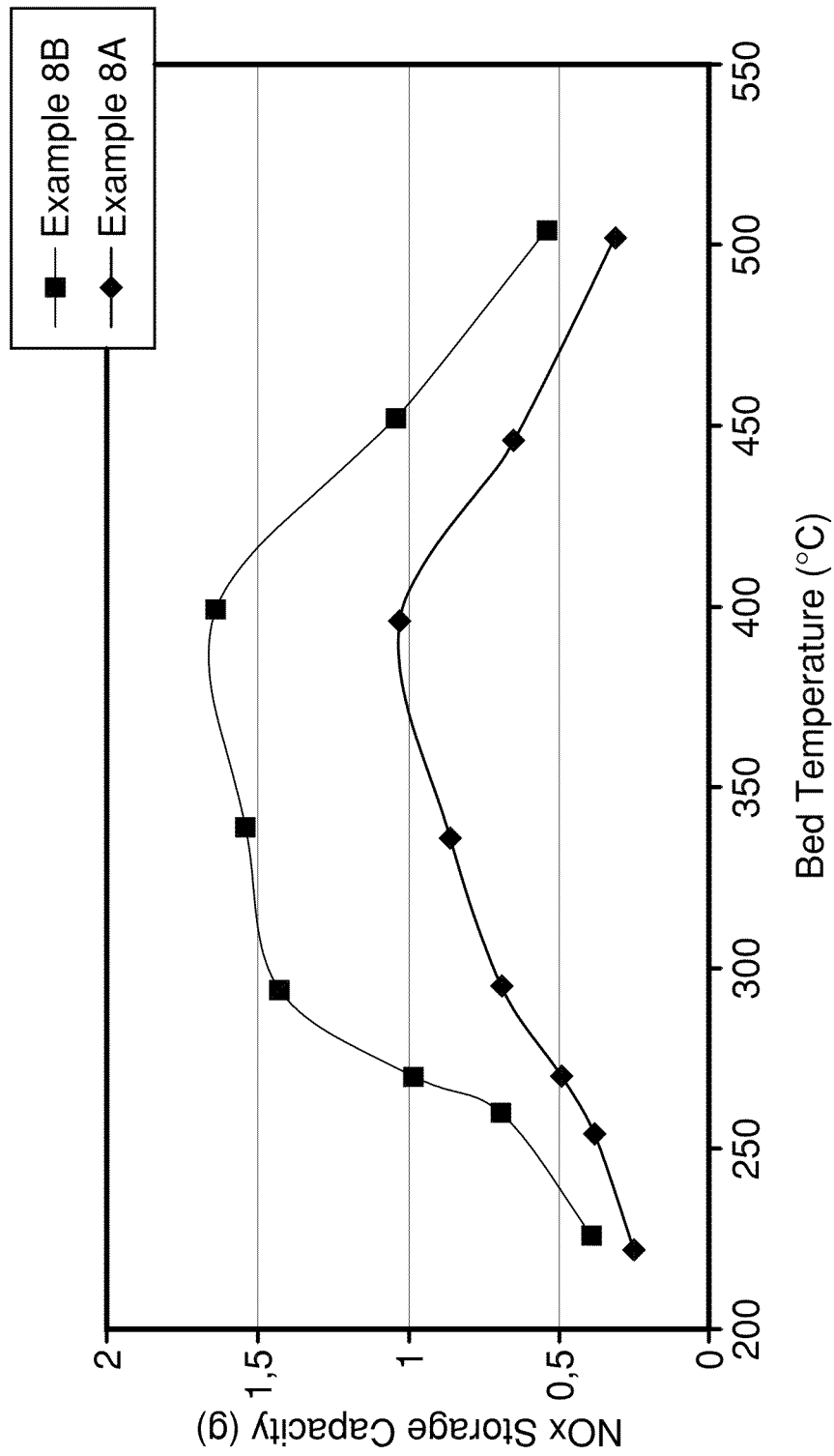
FIG. 4 is a graph comparing the nitrogen oxide storage capacity of two catalysts.
Figure 5:
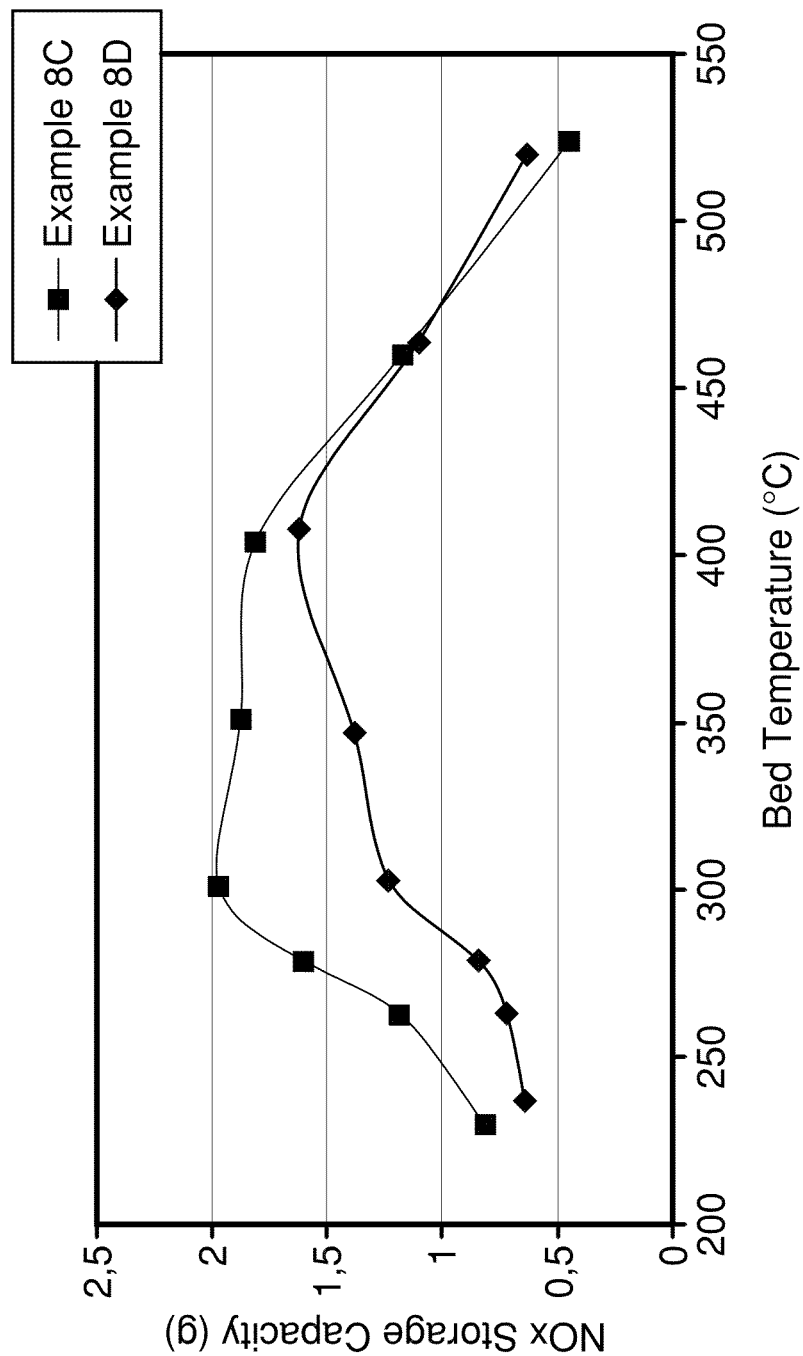
FIG. 5 is a graph comparing the nitrogen oxide storage capacity of two catalysts.

The effect of the refractory oxide to support the precious metal component of the catalyst was also tested. Samples N (Example 8A) and O (Example 8B) from Table IV above were prepared into fully formulated catalysts and tested for NOx storage capacity after aging for 50 hours at 850° C. under stoichiometric conditions. FIG. 4 shows that the lanthana and zirconia doped sample (Example O) exhibited the best results between 250 and 400° C. Similar results were observed for sample N aged 50 hours at 750° C. (Example 8C) and sample O aged 50 hours at 750° C. (Example 8D) at a lean air fuel ratio, and these results are shown in FIG. 5.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A nitrogen oxide storage catalyst comprising: a coating on a substrate, the coating comprising a nitrogen oxide storage material comprising as-prepared, spray dried and calcined alkaline earth carbonate/ceria composite particles having a BET surface area between 40-60 $m^2/g$, the ceria prior to aging having a crystallite size of between about 10 and 20 nm and the alkaline earth carbonate prior to aging having a crystallite size of between about 20-40 nm.

2. The nitrogen oxide storage catalyst of claim 1, wherein the alkaline earth carbonate comprises $BaCO_3$ and the coating further comprises at least one member of platinum group metals selected from the group consisting of platinum, palladium, rhodium, iridium and mixtures thereof supported on refractory oxide particles.

3. The nitrogen oxide storage catalyst of claim 2, wherein the refractory oxide particles comprise aluminum oxide mixed with one or more of zirconia and lanthana, and wherein the aluminum oxide particles have a surface area of 150-250 $m^2/g$.

4. The nitrogen oxide storage catalyst of claim 3, wherein the refractory oxide particles comprise alumina particles and the $BaCO_3$ is fixed to the ceria particles such that the $BaCO_3$ does not migrate to the aluminum oxide particles.

5. The nitrogen oxide storage catalyst of claim 4, wherein the $BaCO_3$ is fixed within the pores of the ceria particles.

6. The nitrogen oxide storage catalyst of claim 5, wherein the aluminum oxide particles have an average pore volume of about 0.3 to about 0.8 ml/g.

7. The nitrogen oxide storage catalyst of claim 6, wherein the pores in the aluminum oxide particles have an average pore diameter of between about 3 nm and about 20 nm.

8. The nitrogen oxide storage catalyst of claim 2, wherein the nitrogen oxide storage material comprises spray dried and calcined material calcined between 550 and 750° C.

9. A catalytic trap disposed in an exhaust passage of an internal combustion engine which operates periodically between lean and stoichiometric or rich conditions, for abatement of $NO_x$ in an exhaust gas stream which is generated by the engine, comprising a catalytic trap material including a catalytic component comprising the nitrogen oxide storage catalyst of claim 1.

10. The catalytic trap of claim 9, wherein the alkaline earth carbonate comprises $BaCO_3$ and the coating further comprises at least one member of platinum group metals selected from the group consisting of platinum, palladium, rhodium, iridium and mixtures thereof supported on refractory oxide particles.

11. The catalytic trap of claim 9, wherein the refractory oxide particles comprise aluminum oxide mixed with one or more of zirconia and lanthana, and wherein the aluminum oxide particles have a surface area of 150-250 $m^2/g$.

12. The catalytic trap of claim 11, wherein the $BaCO_3$ is fixed to the ceria particles such that the $BaCO_3$ does not migrate to the aluminum oxide particles.

13. The nitrogen oxide storage catalyst of claim 11, wherein the $BaCO_3$ is fixed within the pores of the ceria particles.

14. The catalytic trap of claim 13, wherein the aluminum oxide particales have an average pore volume of about 0.3 to about 0.8 ml/g.

15. The catalytic trap of claim 14, wherein the pores in the the aluminum oxide particales have an average pore diameter of between about 3 nm and about 20 nm.

\* \* \* \* \*